(12) United States Patent
Doerr (10) Patent No.: US 11,187,517 B2
(45) Date of Patent: Nov. 30, 2021

(54) COHERENT RECEIVER ARRAY

(71) Applicant: Acacia Communications, Inc., Maynard, MA (US)

(72) Inventor: Christopher Doerr, Middletown, NJ (US)

(73) Assignee: Acacia Communications, Inc., Maynard, MA (US)

(*) Notice: Subject to any disclaimer, the term of this patent is extended or adjusted under 35 U.S.C. 154(b) by 33 days.

(21) Appl. No.: 16/441,576

(22) Filed: Jun. 14, 2019

(65) Prior Publication Data

US 2019/0310071 A1 Oct. 10, 2019

Related U.S. Application Data

(63) Continuation of application No. PCT/US2017/067948, filed on Dec. 21, 2017.

(60) Provisional application No. 62/437,557, filed on Dec. 21, 2016.

(51) Int. Cl.
| | |
|---|---|
| *G01B 9/02* | (2006.01) |
| *G01S 7/4863* | (2020.01) |
| *G01S 17/89* | (2020.01) |
| *G01S 7/481* | (2006.01) |

(52) U.S. Cl.
CPC ..... *G01B 9/02004* (2013.01); *G01B 9/02027* (2013.01); *G01B 9/02051* (2013.01); *G01B 9/02069* (2013.01); *G01B 9/02081* (2013.01); *G01B 9/02091* (2013.01); *G01S 7/4816* (2013.01); *G01S 7/4863* (2013.01); *G01S 17/89* (2013.01); *G01B 2290/45* (2013.01)

(58) Field of Classification Search
CPC ............ G01B 9/02027; G01B 9/02051; G01B 9/02069; G01B 9/02081; G01B 9/02091; G01S 7/4816
See application file for complete search history.

(56) References Cited

U.S. PATENT DOCUMENTS

| | | |
|---|---|---|
| 5,751,830 A | 5/1998 | Hutchinson |
| 7,050,171 B1 | 5/2006 | Banerjee et al. |
| 7,405,834 B1 | 7/2008 | Marron et al. |
| 2012/0120407 A1* | 5/2012 | Frisken ............. G01B 9/02081 356/479 |

(Continued)

FOREIGN PATENT DOCUMENTS

WO WO2018119264 6/2018

OTHER PUBLICATIONS

International Search Report and Written Opinion for International Application No. PCT/US2017/067948, dated Mar. 21, 2018, 11 pages.

*Primary Examiner* — Michael A Lyons
(74) *Attorney, Agent, or Firm* — Joseph D'Angelo (57) ABSTRACT

Optical coherent receiver arrays are described. The optical coherent receiver arrays include an integrated array of photodetectors separated by integrated mirrors which may cause interference of received free space optical and local oscillator signals. The mirrors may serve as splitters, helping to align the received signal and local oscillator to cause interference. The photodetectors of the optical coherent receiver array may be electrically coupled in various manners to read out the signals. The optical coherent receiver array may be implemented in an optical coherence tomography (OCT) imaging system in some embodiments.

20 Claims, 4 Drawing Sheets

(56) References Cited

U.S. PATENT DOCUMENTS

| | | |
|---|---|---|
| 2014/0376001 A1 | 12/2014 | Swanson |
| 2017/0268987 A1 | 9/2017 | Swanson |
| 2017/0268988 A1 | 9/2017 | Swanson |
| 2017/0299500 A1 | 10/2017 | Swanson |
| 2017/0299697 A1 | 10/2017 | Swanson |
| 2018/0364025 A1* | 12/2018 | Schmoll ............ G01B 9/02047 |

* cited by examiner

COHERENT RECEIVER ARRAY

CROSS-REFERENCE TO RELATED APPLICATIONS

The present application is a Continuation of International Application Number PCT/US2017/067948, filed Dec. 21, 2017 under Attorney Docket No. A1117.70073WO00 and entitled "COHERENT RECEIVER ARRAY," which claims the benefit under 35 U.S.C. § 119(e) of U.S. patent application Ser. No. 62/437,557, filed Dec. 21, 2016 and entitled "COHERENT RECEIVER ARRAY," which are hereby incorporated herein by reference in its entirety.

BACKGROUND

Field

The present application relates to coherent optical receivers.

Related Art

Optical coherence tomography operates by interfering an optical signal with a local oscillator. The resulting interference signal is detected and used to create a tomographic image.

BRIEF SUMMARY

According to an aspect of the application, an optical coherent receiver array is provided, comprising: a substrate; a plurality of photodetectors integrated on the substrate; and a plurality of mirrors integrated on the substrate, oriented substantially perpendicularly to the plurality of photodetectors, and configured to interfere first and second incoming optical signals. In some embodiments, the mirrors are partially reflective mirrors. In some embodiments, the mirrors are splitting mirrors.

According to an aspect of the present application, a method of operating a solid state optical coherent receiver array is provided, comprising: performing on-chip free space interference of an optical signal and a reference signal. In some embodiments, the interference is performed using on-chip splitting mirrors.

According to an aspect of the present application, an optical imaging system is provided, comprising: a coherent receiver array comprising a plurality of photodetectors and a plurality of mirrors integrated with the plurality of photodetectors and configured to perform on-chip free space interference of an optical signal and a local oscillator; a first optic configured to provide the optical signal to the coherent receiver array at a positive angle with respect to a normal to the coherent receiver array; and a second optic configured to provide the local oscillator to the coherent receiver array at a negative angle with respect to the normal to the coherent receiver array. In some embodiments, the optical imaging system is a three-dimensional (3D) imaging system. In some embodiments, the optical imaging system is an optical coherence tomography imaging system.

According to an aspect of the present application, an integrated coherent receiver array is provided, comprising a substrate and means for performing on-chip free space interference of an optical signal and a reference signal.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Aspects of the present application relate to a coherent receiver array for use in optical systems. In some embodiments, a one-dimensional (1D) or two dimensional (2D) array of coherent receivers may be integrated on a single optical chip, such as a silicon chip. In some embodiments, the 1D or 2D array of coherent receivers are configured to be top-illuminated. In some embodiments, the coherent receiver array is configured to perform on-chip free space interference of received optical and local oscillator signals. In some embodiments, the coherent receiver array includes integrated photodetectors and splitting mirrors which split and reflect received optical and local oscillator signals, which are then detected by the integrated photodetectors. Circuity may be optionally integrated with the coherent receiver array. In some embodiments, a solid state coherent receiver array includes a substrate, integrated photodetectors, and integrated mirrors, and is configured to perform on-chip free space interference of the received optical and local oscillator signals.

Coherent detection is used in some imaging technologies, such as optical coherence tomography (OCT) and light imaging detection and ranging (LiDAR), to achieve high sensitivity and axial resolution. Aspects of the present application provide an array of coherent receivers. The array of coherent receivers allows for, in at least some embodiments, measurement of multiple signals at substantially the same time (including simultaneously). Measurement of multiple signals at substantially the same time may be used in space-divisional multiplexing communications applications or imaging application, and may facilitate recording of real-time OCT or LiDAR three-dimensional (3D) videos of an object.

The aspects and embodiments described above, as well as additional aspects and embodiments, are described further below. These aspects and/or embodiments may be used individually, all together, or in any combination of two or more, as the application is not limited in this respect.

Figure 1:
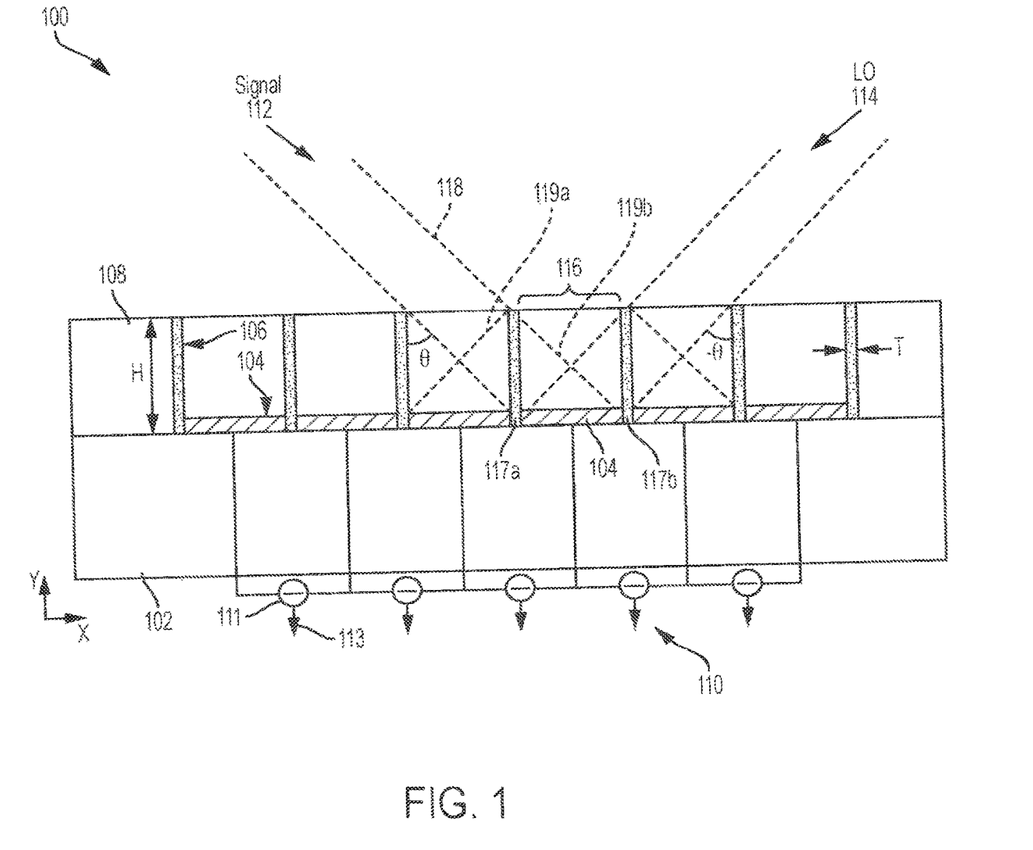
FIG. 1 is a cross-section view of a single-quadrature coherent receiver array, according to a non-limiting embodiment of the present application.

FIG. 1 illustrates an optical coherent receiver array 100 according to a non-limiting embodiment. The illustrated optical coherent receiver array 100 is an integrated coherent receiver array, having integrated photodetectors and mirrors. The illustrated optical coherent receiver array 100 may be considered a solid state optical coherent receiver array. The illustrated optical coherent receiver array may be considered a single chip optical coherent receiver array. In some embodiments, such as that illustrated, the optical coherent receiver array 100 comprises a substrate 102, photodetectors 104, mirrors 106, and a passivation layer 108. In some embodiments, the optical coherent receiver array 100 includes circuitry 110. In the illustrated non-limiting embodiment, the listed components are monolithically integrated in a single chip. In alternative embodiments, the circuitry may be formed on a different chip. In such embodiments, the circuitry chip may be bonded to the receiver array chip and connected electrically by, for example, copper pillars. However, alternatives are possible.

In some embodiments, the substrate 102 may be a semiconductor substrate. For example, the substrate 102 may be a silicon substrate. However, alternative materials may be used. In some embodiments, such as that shown, the substrate 102 includes integrated circuitry 110. In an alternative embodiment, circuitry may be provided separate from the coherent receiver array and configured to receive the output signals of the photodetectors through vias, wire bonds, or any other connection technique suitable for communicating such electrical signals. For example, a separate substrate may include the circuitry and may be coupled to the coherent receiver array by wire bonding, or via electrical traces on a common substrate.

Returning to FIG. 1, the photodetectors 104 may be surface-normal photodetectors. In some embodiments, the photodetectors 104 are formed of a material suitable to detect received signals of a desired wavelength. In one non-limiting example, the photodetectors 104 may be germanium photodetectors. In another non-limiting example, the photodetectors 104 may be silicon photodetectors. Alternative materials may be used. In the illustrated non-limiting example, the substrate 102 may be a silicon substrate and the photodetectors 104 may be germanium photodetectors. The photodetectors may assume a variety of shapes, including square, rectangular, polygonal (e.g., hexagonal or octagonal), or circular, as non-limiting examples. Not shown in FIG. 1 are the p and n contacts to the photodetectors and the bias circuitry, but those may assume any suitable configuration as the various coherent receiver arrays described herein are not limited to any particular manner of making contact to the photodetectors.

Returning to FIG. 1, the mirrors 106 may be splitting mirrors, configured to reflect a portion of an incident signal and transmit (or pass) a portion of the incident signal. For example, the mirrors 106 may be 50-50 splitting mirrors, configured to reflect approximately 50% of incident light of a desired wavelength and to transmit 50% of the incident light of the desired wavelength at the incidence angle as shown in FIG. 1. Other splitting percentages may be used in other embodiments. Returning to FIG. 1, the mirrors 106 may have any suitable dimensions and be formed of any material suitable to cause interference of a received optical signal 112 and local oscillator 114 while also being compatible with microfabrication techniques. In some embodiments, as shown, the mirrors 106 may be taller (in the y-direction) than they are wide (in the x-direction). That is, their height H may be greater than their width T. The mirrors 106 may be formed of SiN, as a non-limiting example. In the illustrated non-limiting embodiment, the mirrors 106 split (or "separate," or "bisect") neighboring photodetectors 106. However, alternative configurations are possible. For example, in an alternative embodiment not illustrated, the photodetectors may be separated by separators of a different material than the mirrors 106, and the mirrors 106 may be disposed on top of those separators. Still further alternatives are possible.

Returning to FIG. 1, the mirrors 106 may be configured to interfere two received free space signals. For example, the mirrors 106 may be configured to interfere free space optical and local oscillator signals. An example is described focusing on the pixel 116 in FIG. 1. The photodetector 104 of pixel 116 is bounded by mirrors 117a and 117b. The optical signal 112 impinging on the photodetector 104 of pixel 116 includes a portion transmitted through mirror 117a at an angle θ and a portion reflected from the mirror 117b at an angle −θ. Local oscillator light 114 impinging on the photodetector 102 of pixel 116 includes a portion transmitted through the mirror 117b at an angle −θ and a portion reflected off the mirror 117a at an angle θ. Therefore, the two portions of the local oscillator light impinging on the photodetector 104 of pixel 116 are aligned with the two portions of the optical signal 112 impinging upon the photodetector 104 of pixel 116. In this manner, the optical signal 112 and local oscillator 114 interfere with each other, providing a coherent signal detected by the photodetector 104. The other pixels of the illustrated optical coherent receiver array operate in the same manner In some embodiments, the height of the mirrors H is approximately the spacing between the mirrors along the chip divided by $\tan(\theta)$.

Figure 3:
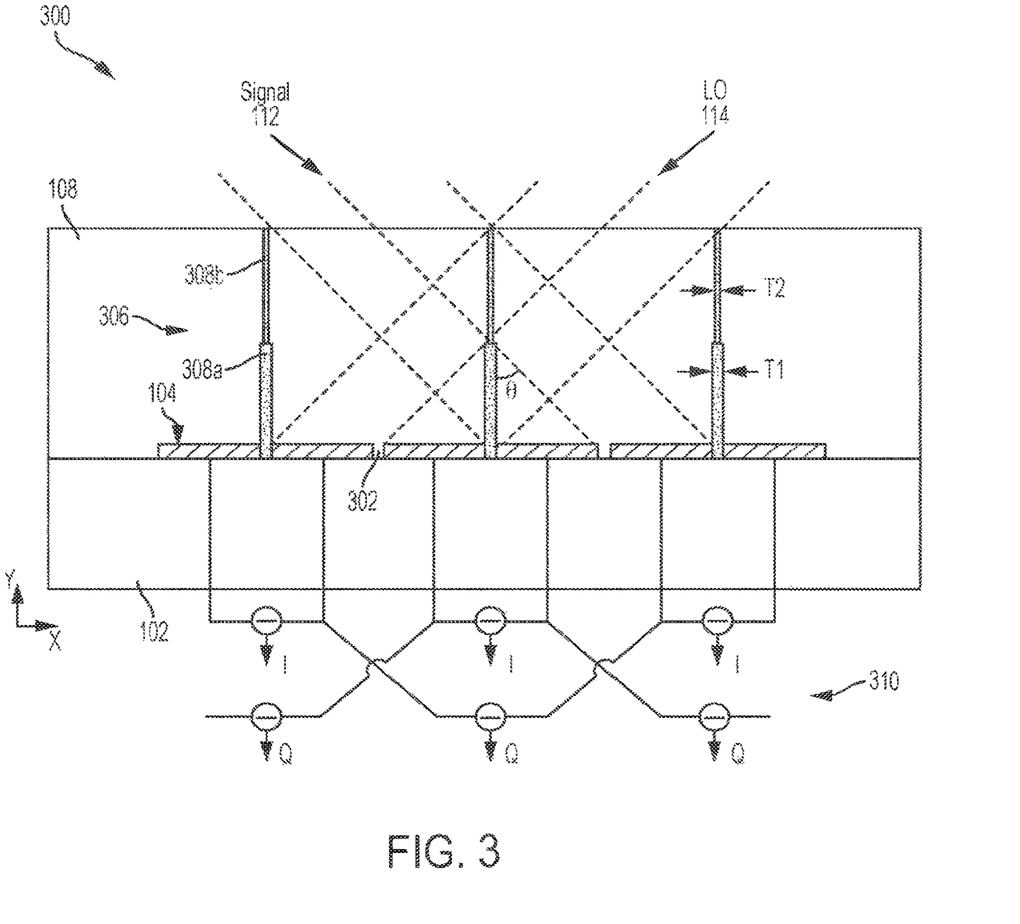
FIG. 3 is a cross-section view of a dual-quadrature coherent receiver array, according to a non-limiting embodiment of the present application.

It should be appreciated that the interference of the optical signal 112 and local oscillator 114 just described with respect to FIG. 1 represents interference of free space signals. The described interference is performed on-chip, by the integrated mirrors 106 of the coherent receiver array 100. Thus, it should be appreciated that in some embodiments on-chip interference of free space signals (e.g., an optical signal and a local oscillator) is provided by an integrated coherent receiver array. The configuration of FIG. 1 provides a single quadrature coherent receiver array because the mirrors 106 are configured to provide a single phase shift to impinging signals. In the illustrated embodiment, the mirrors 106 provide a single phase shift to received signals because they have uniform thicknesses T along their heights H. An alternative configuration imparting multiple phase shifts to received signals is illustrated in FIG. 3 and described further below. Returning to FIG. 1, the illustrated mirrors 106 are also substantially identical to each other in this non-limiting embodiment.

The integrated circuitry 110 may be configured to read out signals from the photodetectors 104 and process the received signals in a variety of ways. In the illustrated non-limiting example, the output signals of neighboring photodetectors are read out and subtracted from each other by subtractors 111 to produce output signals 113. This manner of processing provides improved signal-to-noise ratio (SNR) in at least some embodiments. However, the illustrated processing operation is non-limiting. For example, as shown, the output signals from certain photodetectors of the plurality of photodetectors 104 may be used in two or more subtraction operations as part of combining their signals with the signals output by two or more neighboring photodetectors. In an alternative embodiment the output signal of a photodetector may not be used in two separate subtraction operations. According to an alternative non-limiting embodiment, the output signals of the photodetectors may be processed individually. Lower SNR may result, but may be acceptable for some applications. Improved resolution may be achieved by reading out each pixel individually. FIG. 3, described further below, illustrates an alternative configuration. Returning to FIG. 1, the output signals 113 may be provided to analog-to-digital converters (ADCs) and then to a signal processor. In some embodiments, the ADCs and/or signal processor may be on the same substrate 102.

The circuitry 110 may be silicon circuitry integrated in the substrate 102. In alternative embodiments, the integrated circuitry 110 may be formed separately from the substrate 102, for example on a separate chip or on a printed circuit board.

Returning to FIG. 1, a non-limiting example of the coherent receiver array and its operation are now described. In this non-limiting example, the substrate 102 may be a silicon substrate, the photodetectors 104 may be germanium photodetectors, and the mirrors 106 may be SiN splitting mirrors. The passivation layer 108 may be silicon oxide. The optical signal 112 and local oscillator (LO) 114 may both be approximately 1300-nm-wavelength light. The mirrors 106 may include a thickness T of 540 nm and θ=65°, where θ is the incidence angle. These vertical mirrors serve as 50/50 splitters. The signal 112 enters from one side at θ and the local oscillator (LO) enters from the other side at −θ. For each pixel, half the signal reflects off the mirror and hits a photodetector 104, and the other half transmits through the mirror and hits another photodetector 104. The same operation occurs with the LO 114. The currents from adjacent photodetectors are subtracted from each other in an array of transimpedance amplifiers (TIAs) making up part of circuitry 110. The TIAs are in the substrate 102 in some embodiments, and on another substrate (e.g., another silicon substrate) that is bonded to the photodetector substrate in other embodiments. In some embodiments, an advantage of this scheme may be that the balanced photodetectors are in close proximity, which can reduce noise coupling and improve common mode rejection.

Figure 2:
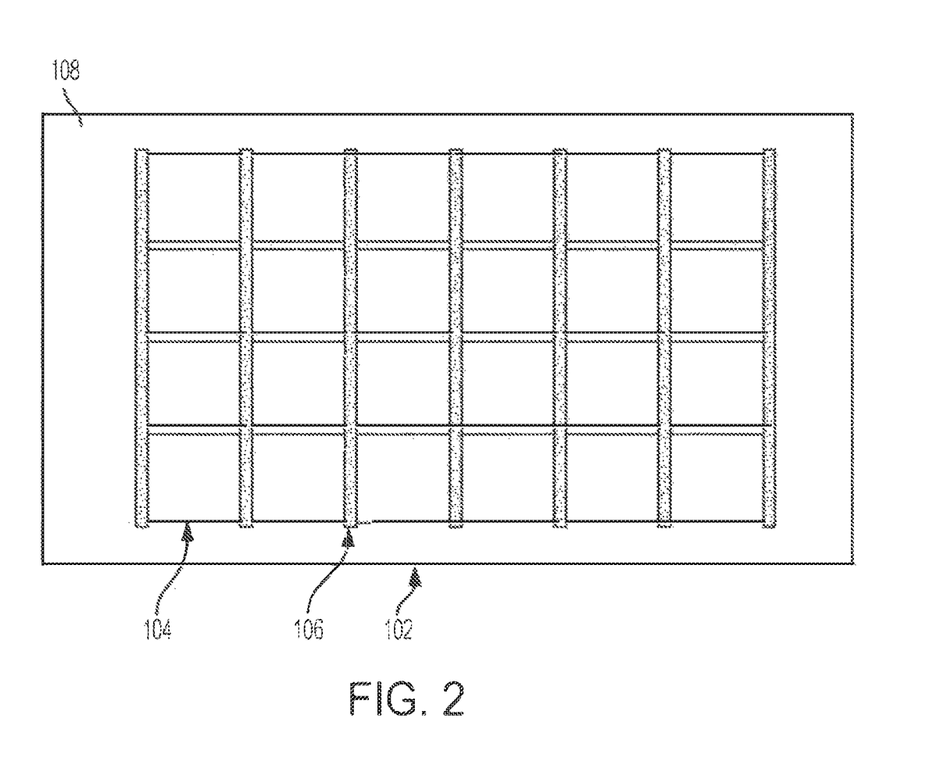
FIG. 2 is a top view of the coherent receiver array of FIG. 1, according to a non-limiting embodiment of the present application.

FIG. 2 illustrates a top view of the coherent receiver array 100 of FIG. 1. That is, FIG. 1 may represent a cross-section of the structure shown in FIG. 2 in a non-limiting embodiment. In this non-limiting embodiment, the plurality of photodetectors 104 forms a 2D array of photodetectors. In an alternative embodiment, the plurality of photodetectors 104 may form a 1D (e.g., linear) array. Returning to FIG. 2, the mirrors 106 form a plurality of parallel rows separating the photodetectors 104. In the illustrated embodiment, the photodetectors 104 are substantially square, but as described previously alternative shapes may be used in alternative embodiments.

The coherent receiver array 100 of FIG. 1 may be fabricated in various ways, using microfabrication techniques. According to one embodiment, the coherent receiver array 100 may be fabricated by depositing and patterning germanium to form germanium photodiodes representing the photodetectors 104. Optionally, one or more layers may be deposited on the photodetectors 104 to act as an antireflection coating, improving the efficiency of the device. Then, a layer of material to be used as the mirrors 106 may be deposited. For example, a layer of SiN may be deposited. The layer of SiN may be thick, for example relative to the layer used to form the photodetectors 104. In some embodiments, the layer of SiN may be between two and ten times thicker than the photodetectors in the y-direction. Then, the SiN layer may be patterned and etched to form the mirrors 106. Next, oxide representing the passivation layer 108 may be deposited to bury the structures.

According to an alternative fabrication method, the mirrors 106 may be formed by filling trenches or grooves in the passivation layer 108. For example, the fabrication of coherent receiver array 100 may comprise depositing and patterning germanium to form germanium photodiodes, representing the photodetectors 104. Optionally, one or more layers may be deposited on the photodetectors 104 to act as an antireflection coating, improving efficiency of the device. Next, the passivation layer 108 may be deposited. Grooves or trenches in the passivation layer 108 may be formed, and then filled with the material being used as the mirrors 106 (e.g., SiN).

In summary, it should be appreciated that in some embodiments coherent receiver arrays may be formed using microfabrication techniques. The processes may be performed at the wafer level (e.g., on a silicon wafer or silicon on insulator (SOI) wafer), and the wafer may be diced to form individual coherent receiver arrays of the type illustrated in FIG. 1. In some embodiments, multiple coherent receiver arrays may be fabricated on a single chip.

FIG. 3 is a cross-section view of a dual-quadrature coherent receiver array, according to a non-limiting embodiment of the present application. The dual-quadrature coherent receiver array compares the received optical signal to two different phases of the local oscillator that are 90 degrees phase-shifted relative to each other. The advantage of a dual-quadrature design is it will, in at least some embodiments, recover the full phase of the signal. In some embodiments, recovery of the full phase of the signal is useful for doubling the allowable scan range in OCT.

Several of the components of the coherent receiver array 300 are the same as for the coherent receiver array 100 of FIG. 1, and thus are labeled with the same reference number and not described again in detail here. The coherent receiver array 300 differs from the coherent receiver array 100 in that it includes mirrors 306 having a non-uniform thickness. The mirrors 306 may be formed of the same material as the mirrors 106 of FIG. 1 (e.g., SiN), but include a first portion 308a and a second portion 308b thinner than the first portion. In the illustrated example, the first portion is closer to the photodetectors than is the second portion 308b. The difference in thicknesses T1 and T2 between the first and second portions 308a and 308b is provided to cause different amounts of phase shift for the impinging signal 112 and local oscillator 114. Appropriate selection of the different thicknesses results in the transmitted signals differing through the portion 308a and 308b different by 45 degrees. The difference between T1 and T2 in some embodiments is approximately $\sin θλ=(4n)$, where λ is the wavelength and n is the refractive index of the mirror material, although other thicknesses may be used. For the embodiment in which the mirrors are formed of SiN, this thickness change may be approximately 150 nm. The same process occurs for both the received signal 112 and the local oscillator 114, except that the phase shifts are in the opposite direction because of the different angles of incidence between the optical signal 112 and local oscillator 114. In the illustrated embodiment, the optical signal 112 may be compared to, and interfered with, two different phases of the local oscillator 114.

The coherent receiver array 300 also includes a gap 302 between two photodetectors 104 located between the same two mirrors 306. The circuitry 310 is configured to subtract signals from neighboring photodetectors 104 as shown to generate a first phase output signal I. The circuitry 310 is configured to subtract signals from alternate pairs of photodetectors 104 to generate a second phase output signal Q. As shown, the circuitry 310 generates both I and Q phase output signals.

The coherent receiver array 300 may be used for space division multiplexing in some embodiments. As described, both I and Q output signals may be provided. Use of advanced modulation formats, such as quadrature phase shift keying (QPSK) allows for performing space division multiplexing with the coherent receiver array.

The coherent receiver array 300 may be fabricated in the same manners described with respect to FIG. 1, except that the formation of the mirrors 306 may differ. The fabrication of the mirrors 306 may involve separate stages for forming the portions 308a and 308b. To form the portions 308a a first layer of material (e.g., SiN) may be deposited and etched. Then, a second layer of the same material may be deposited and etched to form the thinner portions 308b.

Figure 4:
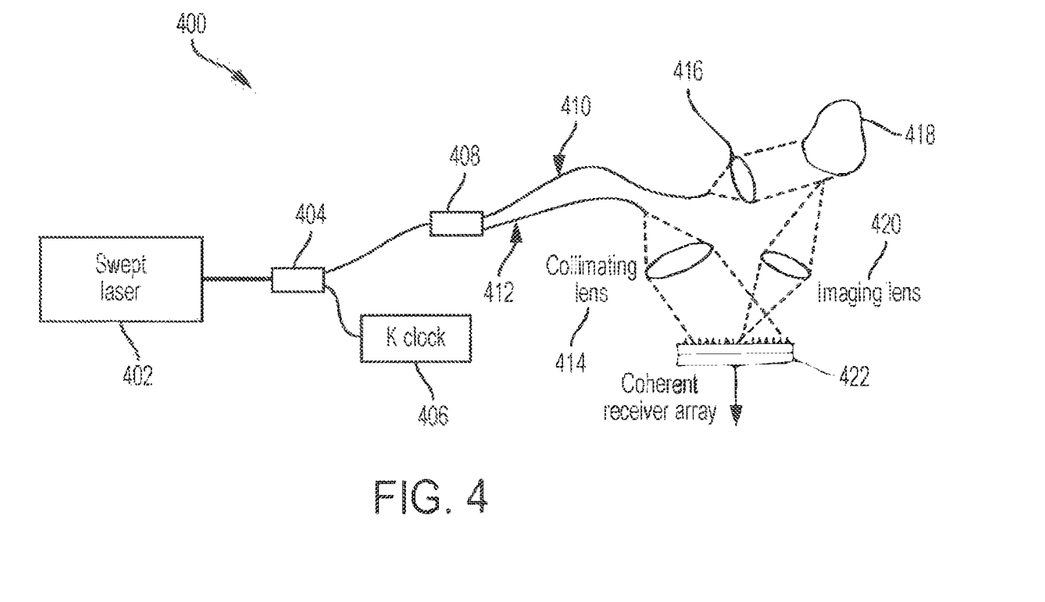
FIG. 4 illustrates an optical coherence tomography (OCT) imager using a coherent receiver array of a type described herein, according to a non-limiting embodiment of the present application.

An example of a configuration to employ coherent receiver arrays of the types described herein is an OCT imager as shown in FIG. 4. The system 400 includes a swept laser 402, splitter 404, k clock 406, splitter 408, optical fiber 410, optical fiber 412, optic 414, optic 416, object 418, optic 420 and coherent receiver array 422. In operation, the swept laser may generate a laser sweep. For example, the swept laser may sweep across between 40 nm and 80 nm over approximately 200 milliseconds. For example, a C-band sweep may be performed. The swept laser signal may be split by the splitter 404 to generate a first optical signal and a k clock. The k clock 406 provides wavelength versus time information for later processing of the signals produced by the coherent receiver array 422. The first optical signal is then split by splitter 408 to produce a second optical signal and a reference signal, for example a local oscillator. The splitter 408 may be a 90-10 splitter configured to provide 90 percent of the signal as the second optical signal and 10 percent of the signal as the local oscillator. However, other splitting ratios may be employed. The second optical signal proceeds though the optical fiber 410 and is used to radiate or illuminate the object 418 via optic 416, which may be a lens or suitable combination of optical components. The signal reflected from the object 418 is provided via the optic 420 (e.g., an imaging lens) to the coherent receiver array 422. The reference signal proceeds through the optical fiber 412 and is provided to the coherent receiver array via optic 414, which may be a collimating lens in this non-limiting embodiment. The coherent receiver array 422 may be a coherent receiver array of the types described herein, and may operate on the received local oscillator and optical signals in the same manner described previously herein with respect to the coherent receiver arrays 100 and 300. The k clock may be used to provide a reference of wavelength of the swept laser as a function of time for processing and understanding the output of the coherent receiver array 422.

Continuing with FIG. 4, the system 400 may be used to image the object 418 without scanning the second optical signal or moving the components of the system. For example, the optic 416, imaging lens 420 and coherent receiver array 422 may remain stationary throughout the imaging process. In some embodiments, the components of the system 400 remain stationary during operation and still a complete image of the object 418 may be provided. This differs from OCT systems requiring scanning of the illuminating laser and/or receiver. Operation of the OCT system 400 may be simpler in some embodiments than if movement or scanning of the system components was required during operation.

The system 400 may be fabricated in various manners. In some embodiments, the illustrated components of the system 400 may be fabricated separately and combined within a housing, module, or other unit. For example, the illustrated components may be discrete components disposed on a printed circuit board. In an alternative embodiment, the components of system 400 may be fabricated on a single chip, thus providing an integrated OCT system. In such embodiments, the optical fibers may be replaced by integrated waveguides and the optics (e.g. lenses) may be formed by microfabricated structures. In some embodiments, an OCT system-on-a-chip is provided in which the illustrated components are formed on a same substrate.

Systems employing coherent receiver arrays of the types described herein may be used as three-dimensional (3D) imaging systems. The coherent receiver arrays may allow for determination of depth information without a reference pulse as is used in time-of-light (TOF) imaging systems. In some embodiments, imaging systems using coherent receiver arrays of the types described herein may be used as imaging cameras, or in automobiles such as in automotive LiDAR systems, as non-limiting examples. In some embodiments, the coherent receiver arrays described herein may be used in hologram receivers since both amplitude and phase information are provided by the coherent receiver arrays. Three-dimensional imaging systems employing optical coherent receive arrays of the types described herein may be simpler and more robust than alternatives, and may be easier to manufacture.

In some embodiments, an OCT camera may implement one or more of the coherent receiver arrays described herein. The OCT camera may be miniaturized in some embodiments. Also, because the entire object may be imaged at once using coherent receiver arrays of the types described herein, the relative phase between pixels can be accurately known for the entire image, allowing for sub-wavelength axial resolution.

As has been described, some embodiments of the present application provide integrated coherent receiver arrays having on-chip splitting mirrors configured to interfere free space optical signals. As an alternative, a free-space circulator may be used so that the illumination beam (e.g., LO) and signal beam (e.g., optical signal 112) are co-linear. In this manner, interference of the signals may occur off-chip, and the interference signals may then be detected by a photodetector array.

The aspects of the present application may provide various benefits, some of which have been described. Additional examples of such benefits are now described, although it should be appreciated that benefits other than those now described may be provided in at least some embodiments and that not all embodiments necessarily provide all listed benefits.

Aspects of the present application provide coherent receiver arrays for use in various optical applications, such as OCT. The coherent receiver arrays may allow for accurate operation, such as accurate OCT, in a relatively short time and without moving parts (e.g., without mechanical scanning) Thus, scanning parts may be avoided. The technology may be used in 3D video cameras with extremely high resolution. Also, large arrays may be fabricated. For example, tends of thousand, hundreds of thousands, or millions of coherent receivers may be formed on a single chip using the technology described herein.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. An optical coherent receiver array, comprising:
a substrate;
a plurality of photodetectors integrated on the substrate; and
a plurality of mirrors integrated on the substrate, oriented substantially perpendicularly to the plurality of photodetectors, and configured to interfere first and second incoming optical signals;
wherein a first mirror of the plurality of mirrors has a non-uniform thickness; wherein the first mirror comprises a first portion of a first thickness and a second portion of a second thickness less than the first thickness, the first portion being between the second portion and the plurality of photodetectors.

2. The optical coherent receiver array of claim 1, wherein a first mirror of the plurality of mirrors is a splitting mirror.

3. The optical coherent receiver array of claim 1, wherein a first mirror of the plurality of mirrors is taller than it is wide.

4. The optical coherent receiver array of claim 1, wherein the plurality of photodetectors form a two-dimensional array.

5. The optical coherent receiver array of claim 4, wherein the plurality of mirrors substantially form a grid.

6. The optical coherent receiver array of claim 1, wherein the optical coherent receiver array is a single-quadrature optical coherent receiver array.

7. The optical coherent receiver array of claim 1, wherein the optical coherent receiver array is a dual-quadrature optical coherent receiver array.

8. The optical coherent receiver array of claim 1, wherein the plurality of photodetectors comprises a first photodetector neighboring a second photodetector, and wherein the optical coherent receiver array further comprises electronic circuitry configured to subtract an output signal of the first photodetector from an output signal of the second photodetector.

9. The optical coherent receiver array of claim 1, further comprising electronic circuitry configured to produce Inphase (I) signals and Quadrature (Q) signals from outputs of the plurality of photodetectors.

10. The optical coherent receiver array of claim 1, wherein the plurality of mirrors are monolithically integrated on the substrate.

11. The optical coherent receiver array of claim 1, further comprising electronic circuitry comprising a plurality of transimpedance amplifiers (TIAs), wherein a first TIA of the plurality of TIAs has inputs configured to subtract output signals of respective photodetectors or the plurality of photodetectors.

12. A method of operating a solid state optical coherent receiver array, comprising:
performing on-chip free space interference of an optical signal and a reference signal;
wherein the solid state optical coherent receiver array has a plurality of mirrors and a plurality of photodetectors;
wherein a first mirror of the plurality of mirrors has a non-uniform thickness;
wherein the first mirror comprises a first portion of a first thickness and a second portion of a second thickness less than the first thickness, the first portion being between the second portion and the plurality of photodetectors.

13. The method of claim 12, wherein performing on-chip free space interference of the optical signal and the reference signal comprises receiving the optical signal at a first angle, receiving the reference signal at a second angle, and aligning the optical signal and reference signal using a splitting mirror.

14. The method of claim 13, wherein aligning the optical signal and the reference signal generates an interfered signal, the method further comprising detecting the interfered signal using an on-chip photodetector.

15. An optical imaging system, comprising:
a coherent receiver array comprising a plurality of photodetectors and a plurality of mirrors integrated with the plurality of photodetectors and configured to perform on-chip free space interference of an optical signal and a local oscillator;
a first optic configured to provide the optical signal to the coherent receiver array at a positive angle with respect to a normal to the coherent receiver array; and
a second optic configured to provide the local oscillator to the coherent receiver array at a negative angle with respect to the normal to the coherent receiver array;
wherein a first mirror of the plurality of mirrors has a non-uniform thickness; wherein the first mirror comprises a first portion of a first thickness and a second portion of a second thickness less than the first thickness, the first portion being between the second portion and the plurality of photodetectors.

16. The optical imaging system of claim 15, wherein the coherent receiver array is a single quadrature receiver array.

17. The optical imaging system of claim 15, wherein the coherent receiver array is a dual-quadrature receiver array.

18. The optical imaging system of claim 15, wherein the optical signal represents a signal reflected from a target object.

19. The optical imaging system of claim 15, further comprising a swept laser configured to provide a laser signal, and a splitter configured to generate the local oscillator from the laser signal.

20. The optical imaging system of claim 15, further comprising a third optic configured to direct the optical signal to a target object, wherein the first optic is configured to provide the optical signal to the coherent receiver array after reflection of the optical signal from the target object, and wherein the first, second, and third optics and the coherent receiver array are configured to remain stationary during imaging of the target object.

* * * * *